US009858738B2

(12) United States Patent
Wilkinson

(10) Patent No.: US 9,858,738 B2
(45) Date of Patent: Jan. 2, 2018

(54) APPARATUS AND METHOD TO DETERMINE WHETHER TO UNLOCK A DELIVERED-PACKAGE VAULT

(71) Applicant: Wal-Mart Stores, Inc., Bentonville, AR (US)

(72) Inventor: Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/183,237

(22) Filed: Jun. 15, 2016

(65) Prior Publication Data

US 2017/0018133 A1 Jan. 19, 2017

Related U.S. Application Data

(60) Provisional application No. 62/194,126, filed on Jul. 17, 2015.

(51) Int. Cl.
*G06F 7/04* (2006.01)
*G07C 9/00* (2006.01)

(52) U.S. Cl.
CPC ..... *G07C 9/00309* (2013.01); *G07C 9/00031* (2013.01); *G07C 2009/0092* (2013.01); *G07C 2009/00769* (2013.01)

(58) Field of Classification Search
CPC ........ A47B 96/02; A47F 3/002; A47F 7/0246; B65G 1/0485; G05D 3/00; G06F 17/00;
(Continued)

(56) References Cited

U.S. PATENT DOCUMENTS 5,886,634 A 3/1999 Muhme
6,370,513 B1 4/2002 Kolawa
(Continued)

FOREIGN PATENT DOCUMENTS

WO 2012174387 A2 12/2012

OTHER PUBLICATIONS

Missiouri Revised Statutes. Chapter 311: Liquor Control Law, Aug. 28, 2014, 3 pages.
(Continued)

*Primary Examiner* — Naomi Small
(74) *Attorney, Agent, or Firm* — Fitch, Even, Tabin & Flannery LLP

(57) ABSTRACT

A delivered-package vault has a selectively-lockable access portal that is configured to contain at least one package, which package has at least one recipient-specific requirement associated therewith. The delivered-package vault also includes a two-way communications interface configured to communicate with a remote source having that at least one recipient-specific requirement and further includes a control circuit that operably couples to the two-way communications interface and the selectively-lockable access portal. The control circuit is configured to communicate with the remote source regarding the at least one recipient-specific requirement for the at least one package that is presently in the delivered-package vault and to unlock the selectively-lockable access portal to thereby provide access to the at least one package by a recipient who meets the at least one recipient-specific requirement.

16 Claims, 4 Drawing Sheets

(58) Field of Classification Search
CPC ..... G06Q 10/0836; G07F 17/10; G07F 17/12; G07F 7/08; Y10T 29/49815; G07C 9/00309; G07C 9/00031; G07C 2009/00769; G06K 7/10415
USPC ........................................................ 340/5.61
See application file for complete search history.

(56) References Cited

U.S. PATENT DOCUMENTS

| | | | | |
|---|---|---|---|---|
| 6,430,541 | B1 | 8/2002 | Brown | |
| 6,879,243 | B1 * | 4/2005 | Booth | E05B 47/026 340/5.73 |
| 6,967,575 | B1 | 11/2005 | Dohrmann | |
| 6,975,910 | B1 | 12/2005 | Brown | |
| 8,326,646 | B2 | 12/2012 | Schwarzberg | |
| 8,706,525 | B2 | 4/2014 | Schwarzberg | |
| 9,223,315 | B2 * | 12/2015 | Irwin | G05D 3/00 |
| 2002/0035515 | A1 * | 3/2002 | Moreno | A47G 29/141 340/5.73 |
| 2002/0046060 | A1 | 4/2002 | Hoskyns | |
| 2002/0180582 | A1 | 12/2002 | Nielsen | |
| 2005/0075989 | A1 | 4/2005 | Biasi | |
| 2005/0171800 | A1 | 8/2005 | Yamaguchi | |
| 2006/0199155 | A1 | 9/2006 | Mosher | |
| 2007/0090921 | A1 | 4/2007 | Fisher | |
| 2007/0192191 | A1 * | 8/2007 | Neal | G06Q 10/08 705/14.26 |
| 2008/0246587 | A1 | 10/2008 | Fisher | |
| 2010/0003647 | A1 | 1/2010 | Brown | |
| 2011/0042331 | A1 * | 2/2011 | Johnson | A47F 3/002 211/49.1 |
| 2012/0136731 | A1 | 5/2012 | Kidron | |
| 2012/0194043 | A1 * | 8/2012 | Turner | G07F 7/00 312/109 |
| 2013/0063008 | A1 | 3/2013 | Martin | |
| 2013/0166060 | A1 | 6/2013 | Irwin | |
| 2013/0339163 | A1 | 12/2013 | Dumontet | |
| 2014/0095479 | A1 | 4/2014 | Chang | |
| 2014/0236688 | A1 * | 8/2014 | Minter | G06Q 10/0836 705/14.4 |
| 2014/0258168 | A1 * | 9/2014 | Crawford | G06Q 10/0836 705/339 |
| 2014/0330428 | A1 | 11/2014 | Wolfe | |
| 2014/0379607 | A1 * | 12/2014 | Chousa | G06Q 10/0836 705/339 |
| 2015/0106296 | A1 * | 4/2015 | Robinson | G06F 21/62 705/339 |
| 2015/0112887 | A1 * | 4/2015 | Camp | G06Q 10/0837 705/339 |
| 2015/0371187 | A1 * | 12/2015 | Irwin | G06Q 10/0836 705/72 |

OTHER PUBLICATIONS

PCT; App. No. PCT/US2014/056267; International Search Report dated Dec. 31, 2014; 3 pages.

PCT; App. No. PCT/US2014/056267; Written Opinion dated Dec. 31, 2014; 7 pages.

U.S. Appl. No. 14/052,102; Office Action dated Oct. 30, 2015; 18 pages.

U.S. Appl. No. 14/052,102; Examiner's Answer to Appeal Brief dated Aug. 18, 2016; 7 pages.

U.S. Appl. No. 14/052,102; Office Action dated May 6, 2015; 24 pages.

* cited by examiner

APPARATUS AND METHOD TO DETERMINE WHETHER TO UNLOCK A DELIVERED-PACKAGE VAULT

RELATED APPLICATION(S)

This application claims the benefit of U.S. Provisional application No. 62/194,126, filed Jul. 17, 2015, which is incorporated by reference in its entirety herein.

TECHNICAL FIELD

These teachings relate generally to delivery receptacles.

BACKGROUND

Delivery receptacles are known in the art. Residential and business Postal Service mailboxes are one example in these regards. In some cases the mailbox is an unsecured container into which a letter carrier places delivered mail. In other cases a keyed lock secures the container, with both the letter carrier and the recipient having a corresponding key. Legal restrictions typically prohibit non-Postal Service delivery services from using mailboxes when making their deliveries. In any event, unsecured containers may be inappropriate for many delivery purposes.

Furthermore, even secured containers can be inappropriate for some delivery purposes. For example, the delivery of some packages may be conditioned upon one or more recipient-specific requirements. As one simple example, some pharmaceuticals may only be appropriately delivered to a particular individual and/or their authorized caretaker. While other delivery receptacles have been proposed from time to time to provide a viable option for non-Postal Service delivery services, developments to date have been at least partially inadequate in terms of meeting such needs.

BRIEF DESCRIPTION OF THE DRAWINGS

The above needs are at least partially met through provision of the apparatus and method to determine whether to unlock a delivered-package vault described in the following detailed description, particularly when studied in conjunction with the drawings, wherein.

Figure 1:
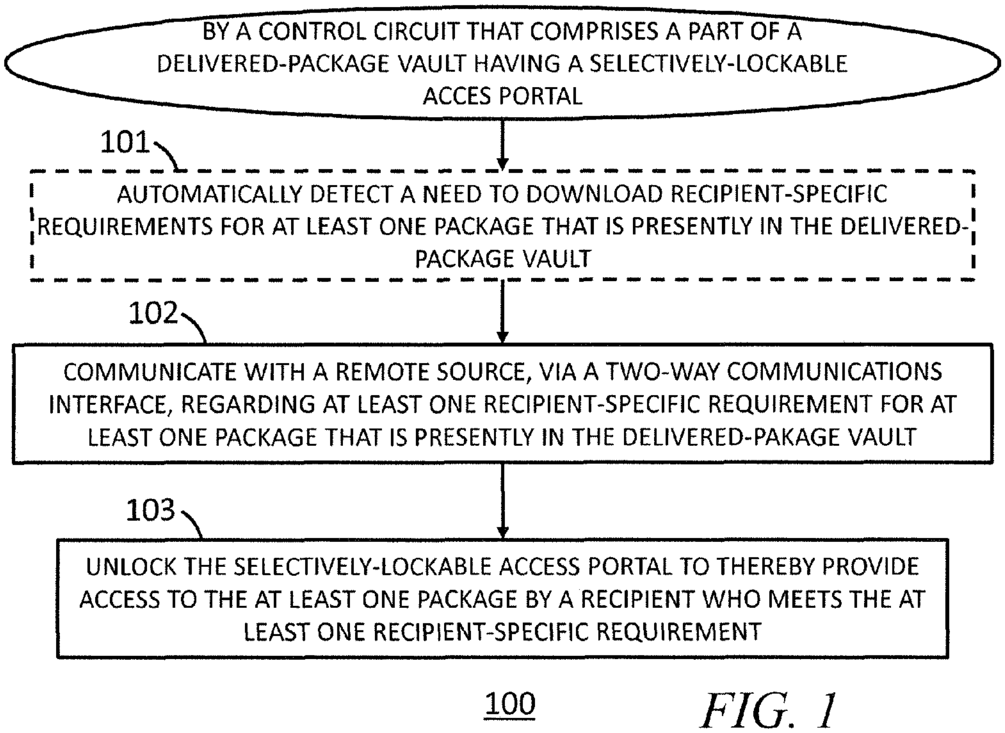
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments are suitable for use with a delivered-package vault having a selectively-lockable access portal that is configured to contain at least one package, which package has at least one recipient-specific requirement associated therewith. The delivered-package vault also includes a two-way communications interface configured to communicate with a remote source having that at least one recipient-specific requirement and a control circuit that operably couples to the two-way communications interface and the selectively-lockable access portal. The control circuit is configured to communicate with the remote source regarding the at least one recipient-specific requirement for the at least one package that is presently in the delivered-package vault and to unlock the selectively-lockable access portal to thereby provide access to the at least one package by a recipient who meets the at least one recipient-specific requirement.

By one approach, the control circuit accomplishes the foregoing by downloading from the remote source the recipient-specific requirements which the control circuit then uses to determine whether to unlock the selectively-lockable access portal. By another approach, the control circuit accomplishes the foregoing by transmitting information to the remote source as provided by a potential recipient and where the control circuit is configured to unlock the selectively-lockable access portal upon receiving unlock instructions from the remote source when the latter concludes that the potential recipient meets the at least one recipient-specific requirement.

These teachings are highly flexible in practice and will accommodate a variety of approaches in the foregoing regards. As one example in these regards, the aforementioned recipient-specific requirement can comprise a recipient age-based requirement. For example, the recipient age-based requirement may be a requirement that the recipient to be at least 21 years of age. In such a case the control circuit might only unlock the selectively-lockable access portal for a recipient if the recipient is at least 21 years of age.

As another example in these regards, the aforementioned recipient-specific requirement can comprise an identity-based requirement such that the control circuit may only unlock the selectively-lockable access portal for a recipient if the recipient has an identity that matches the identity-based requirement.

By one approach, the control circuit is further configured to assess credentials presented by an authorized delivery person who seeks to deliver a package to the delivered-package vault subsequent to a controlled package having been placed in the delivered-package vault and prior to that package having been removed by an authorized recipient. So configured, the control circuit can automatically unlock the selectively-lockable access portal to thereby permit an authorized delivery person to place another delivered item into the delivered-package vault notwithstanding that the previously-delivered package is still in the delivered-package vault.

So configured, these teachings will readily accommodate a wide variety of recipient-specific requirements and hence a wide variety of packages and delivery schemes and protocols. These teachings are readily employed in conjunction with a delivered-package vault that can also find use with uncontrolled deliveries and hence provide economically advantageous economies of scale.

Figure 2:
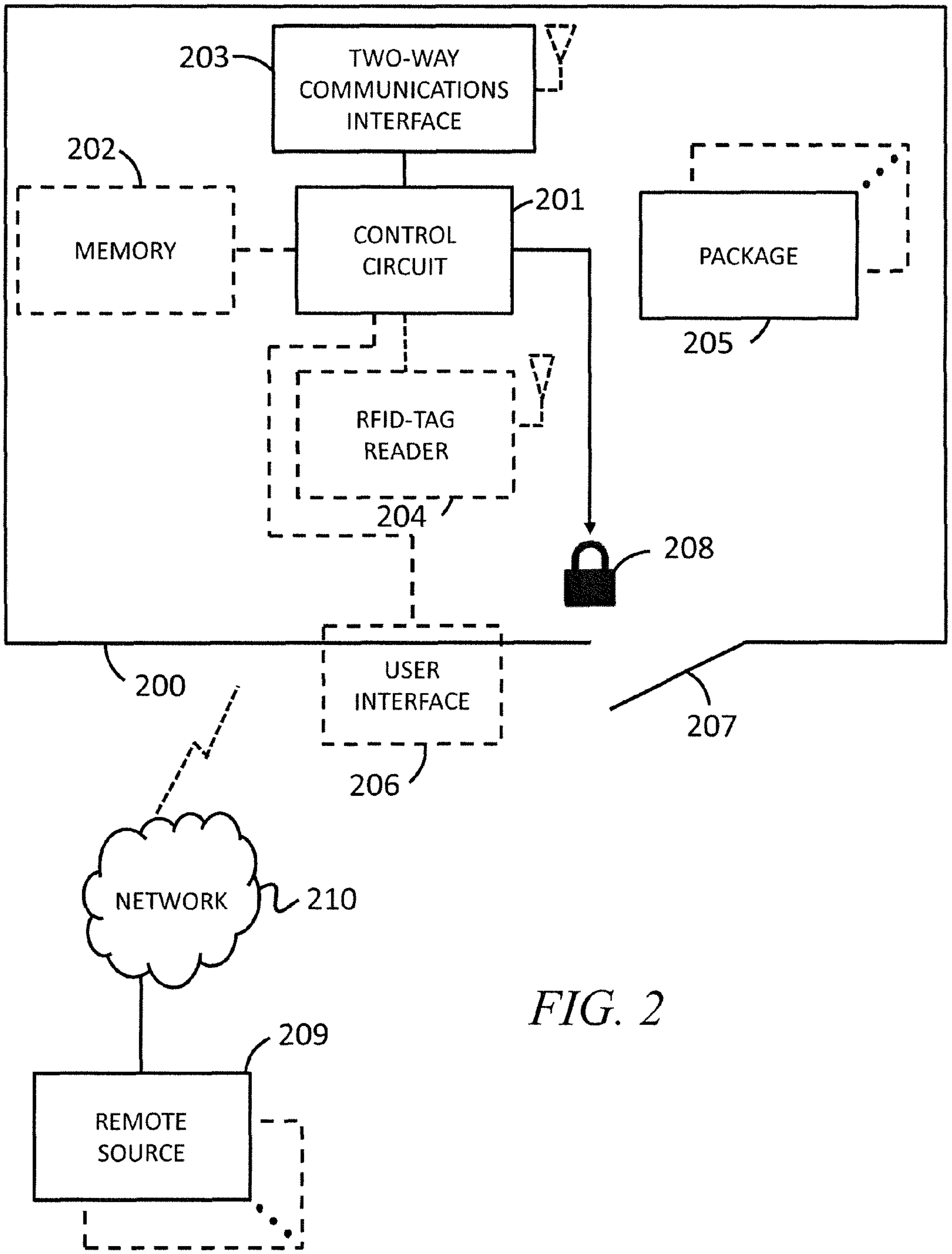
FIG. 2 comprises a block diagram as configured in accordance with various embodiments of these teachings.

These and other benefits may become clearer upon making a thorough review and study of the following detailed description. Referring now to the drawings, and in particular to FIG. 1, an illustrative process 100 that is compatible with many of these teachings will now be presented. For the sake of an illustrative example it will be presumed here that a control circuit that comprises a part of a delivered-package vault having a selectively-lockable access portal carries out the aforementioned process 100. FIG. 2 presents an illustrative example in those regards.

In this example a delivered-package vault 200 includes a control circuit 201. Being a "circuit," the control circuit 201 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 201 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 201 is configured (for example, by using corresponding programming as will be well understood by those skilled in the art) to carry out one or more of the steps, actions, and/or functions described herein.

By one optional approach the control circuit 201 operably couples to a memory 202 that may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to non-transitorily store computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The control circuit 201 in any event operably couples to a two-way communications interface 203. In many application settings it will be beneficial for this two-way communications interface 203 to comprise a wireless communications interface. Numerous transceiver arrangements and methodologies are known in the art. The two-way communications interface 203 may comprise, for example, a transceiver that employs cellular telephony techniques, Wi-Fi techniques, Bluetooth-compatible techniques, and so forth as desired. As the present teachings are not overly sensitive to any particular choices in these regards, further elaboration regarding the two-way communications interface 203 is not provided here for the sake of brevity.

By one optional approach the control circuit 201 also operably couples to a radio-frequency identification (RFID)-tag reader 204. By one approach this RFID-tag reader 204 is configured to read RFID tags that are part of or otherwise attached to one or more packages 205 as may be disposed within the delivered-package vault 200. By another approach, in lieu of the foregoing or in combination therewith, this RFID-tag reader 204 may be configured to read RFID tags that are external to the delivered-package vault 200 (for example, RFID tags that are worn by or presented by an authorized delivery person and/or an authorized recipient). As with two-way communications interfaces, various RFID-tag readers are known in the art. Accordingly, and again, further elaboration is not provided here regarding such readers for the sake of brevity.

By another optional approach (in lieu of the foregoing or in combination therewith) the control circuit 201 operably couples to a user interface 206. This user interface 206 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user. By one approach this user interface 206 is disposed proximal to an access portal 207 for the delivered-package vault 200. So disposed, the user interface 206 is readily accessible to, for example, a delivery person and/or the intended recipient of a package 205 that is placed within the delivered-package vault 200.

By one approach the access portal 207 comprises a selectively-lockable access portal 207. As illustrated, the locking mechanism 208 is operably coupled to and responds to the control circuit 201. So configured the control circuit 201 can selectively control the locked/unlocked state of the selectively-lockable access portal 207.

So configured the control circuit 201 can communicate via the aforementioned two-way communications interface 203 with one or more remote sources 209. In many cases the two-way communications interface 203 facilitates such communications via one or more intervening networks 210 such as one or more wireless telephony/data networks and/or the Internet. In the present illustrative example the remote source 209 includes one or more recipient-specific requirements for at least one package 205 that is presently in the delivered-package vault 200.

With continued reference to FIGS. 1 and two, at optional block 101 the control circuit 201 automatically detects a need to download recipient-specific requirements for at least one package 205 that is presently in the delivered-package vault 200. By one approach the control circuit 201 bases this determination upon information gleaned when reading an RFID tag for that package 205. That information might indicate, for example, an age requirement for the recipient or an identity requirement for the recipient. In this example the information does not constitute the specifics of the recipient-specific requirement itself. For example, this information might indicate an age requirement without specifying what that age requirement is.

In any event, at block 102 the control circuit 201 communicates with the aforementioned remote source 209 (via the aforementioned two-way communications interface 203) regarding at least one recipient-specific requirement for at least one package 205 that is presently in the delivered-package vault 200. By one approach this communication constitutes downloading recipient-specific requirements from the remote source 209 (for example, in response to having detected a need to so download such requirements at optional block 101 described above).

By another approach this communication constitutes uploading to the remote source 209 information provided by a potential recipient (for example, as entered by the potential recipient via the aforementioned user interface 206 or as gleaned by the aforementioned RFID-tag reader 204 upon reading an RFID tag offered by the potential recipient). The information so uploaded to the remote source 209 can be specific as regards particular required recipient-specific requirements or can be inclusive of other items of information as well as desired.

These teachings are highly flexible in practice and will accommodate a variety of specific approaches. By one approach, for example, the recipient-specific requirement comprises a recipient age-based requirement. For example, the recipient age-based requirement may be a requirement that the recipient be at least 21 years of age as might be the case with a variety of age-controlled products. As another example, the recipient-specific requirement might comprise an identity-based requirement (for example, specifying that the package 205 only be delivered to a particular individual or to any of a plurality of authorized identities such as the specific adults who comprise a particular household).

At block 103 of this process 100, the control circuit 201 unlocks the selectively-lockable access portal 207 to thereby provide access to the at least one package 205 by a recipient who meets the at least one recipient-specific requirement. By one approach, when the control circuit 201 previously downloaded the recipient-specific requirements from the remote source 209, this activity can comprise the control circuit 201 using those downloaded recipient-specific requirements to determine whether to unlock the selectively-lockable access portal 207. By another approach, when the control circuit 201 previously uploaded the information provided by the potential recipient to the remote source 209, this activity can comprise receiving unlock instructions from the remote source 209 when the latter concludes that the potential recipient meets the one or more recipient-specific requirements for the package in question.

Figure 3:
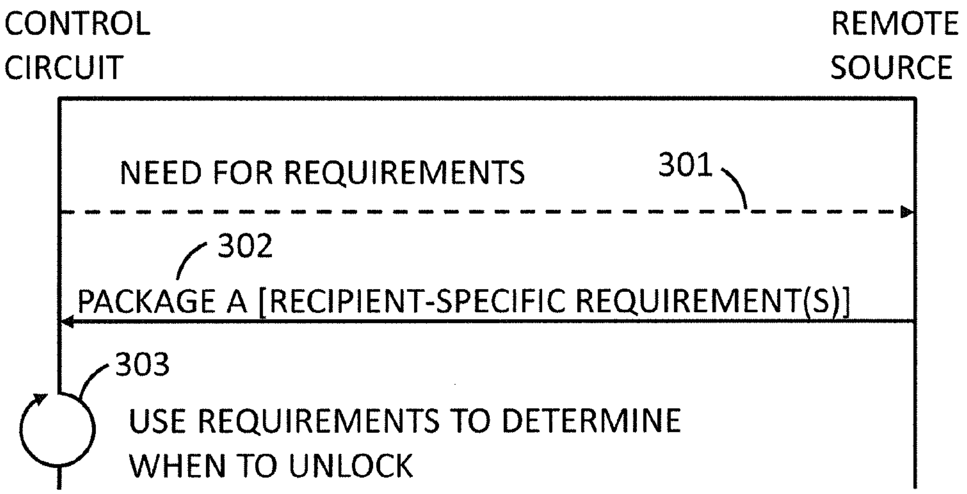
FIG. 3 comprises a call-flow diagram as configured in accordance with various embodiments of these teachings.

This process 100 is highly flexible in practice as described above. FIG. 3 provides one illustrative example in these regards. In this example, the control circuit 201 transmits to the remote source 209 an optional message indicating a need to receive one or more recipient-specific requirements as pertains, for example, to a package 205 presently contained within the delivered-package vault 200. Whether in response to such a request or otherwise, the remote source 209 transmits to the control circuit 201 a message 302 that comprises the recipient-specific requirements as correspond, for example, to the aforementioned package (denoted here as "package A"). As denoted at reference numeral 303 the control circuit 201 then uses those recipient-specific requirements to determine whether and when to unlock the selectively-lockable access portal 207 to thereby provide access to such a package 205 by a recipient.

Figure 4:
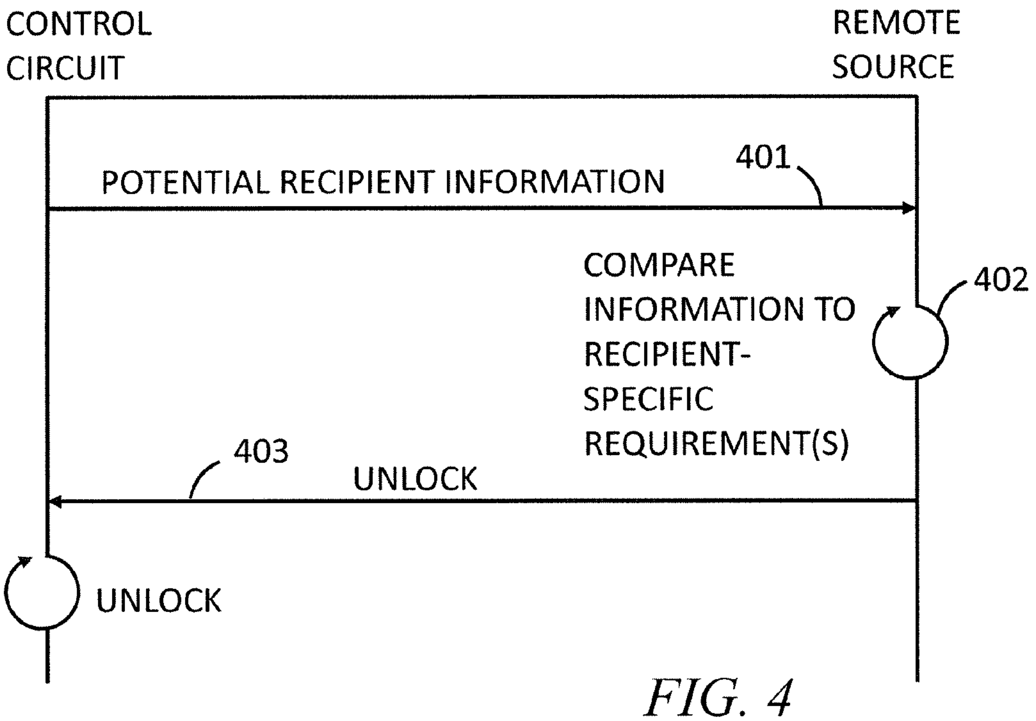
FIG. 4 comprises a call-flow diagram as configured in accordance with various embodiments of these teachings.

FIG. 4 provides another illustrative example in these regards. In this example, the control circuit 201 carries out the above-described process 100 by transmitting a message 401 to the remote source 209 that includes information regarding a potential recipient that presently seeks access to the package 205. As denoted at reference numeral 402, the remote source 209 compares some or all of that information to one or more recipient-specific requirements as correspond to that package 205. Upon so authenticating the potential recipient, the remote source 209 transmits a message 403 to the control circuit 201 instructing the latter to unlock the selectively-lockable access portal 207 to thereby provide access to the package 205 by the recipient.

Figure 5:
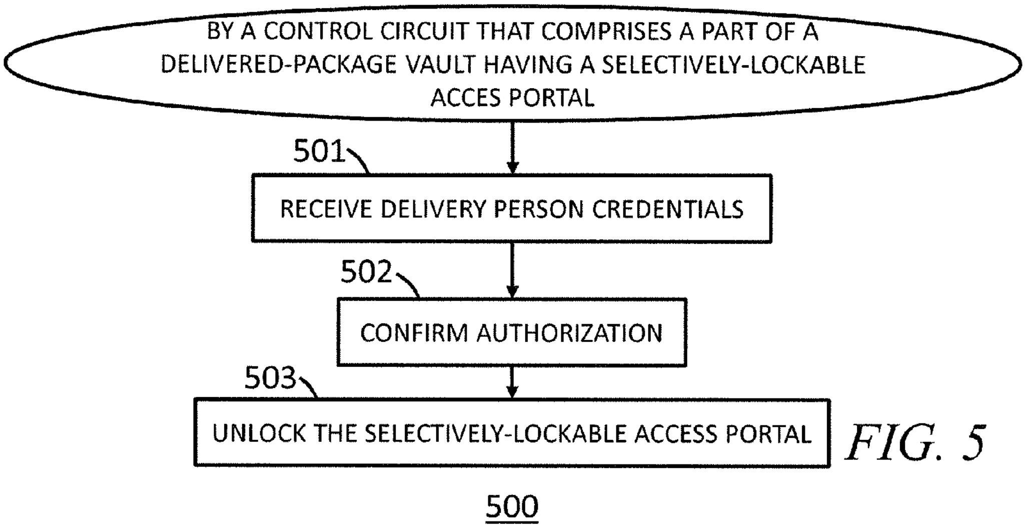
FIG. 5 comprises a flow diagram as configured in accordance with various embodiments of these teachings.

As another example of the flexibility of these teachings in practice, the described approach can readily accommodate a delivery person who seeks to open the delivered-package vault 200 in order to place another package therein prior to the time when an earlier-placed package has been removed by an authorized recipient. FIG. 5 presents one approach in these regards. Pursuant to this process 500, the control circuit 201 receives one or more credentials from such a delivery person at block 501. Such credentials may be presented via, for example, the aforementioned user interface 206 and/or the aforementioned RFID-tag reader 204. Those credentials can vary with the needs of the application setting. Examples include but are not limited to the delivery person's name or other identifier, the name of the delivery service, a special number or other identifier, and so forth.

At block 502 the control circuit confirms that the delivery person is suitably authorized. By one approach the control circuit 201 performs the authentication itself. By another approach the control circuit 201 forwards those credentials to a remote source 209 and the remote source 209 performs the authentication.

At block 503 the control circuit 201 unlocks the selectively-lockable access portal 207 (either in response to its own authentication capability or in response to having received a corresponding instruction or authorization from the remote source 209). The delivery person can then open the access portal 207 and place the additional package in the delivered-package vault 200.

So configured, unattended deliveries can be accommodated for a wide range of items for which an unattended delivery might not ordinarily be permitted. That capability, in turn, can greatly simplify the logistics of scheduling and delivering items to specific individuals, homes, offices, or the like. Accordingly, these teachings can significantly help with reducing the costs associated with such deliveries.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:

a delivered-package vault having a selectively-lockable access portal and configured to contain at least one package having at least one recipient-specific requirement associated therewith;

a two-way communications interface configured to communicate with a remote source having the at least one recipient-specific requirement;

a radio-frequency identification (RFID)-tag reader;

a control circuit operably coupled to the RFID-tag reader, the two-way communications interface and the selectively-lockable access portal and configured to:

use the RFID-tag reader to read an RFID tag for the at least one package that is presently in the delivered-package vault;

use information gleaned from reading the RFID tag to automatically detect a need to download the recipient-specific requirements from the remote source for at least one package that is presently in the delivered-package vault;

communicate with the remote source, via the two-way communications interface, regarding the at least one recipient-specific requirement for the at least one package that is presently in the delivered-package vault; and unlock the selectively-lockable access portal to thereby provide access to the at least one package by a recipient who meets the at least one recipient-specific requirement.

2. The apparatus of claim 1 wherein the two-way communications interface comprises a wireless two-way communications interface.

3. The apparatus of claim 1 wherein the at least one recipient-specific requirement comprises a recipient age-based requirement.

4. The apparatus of claim 3 wherein the recipient age-based requirement is a requirement that the recipient be at least 21 years of age, such that the control circuit will only unlock the selectively-lockable access portal for a recipient if the recipient is at least 21 years of age.

5. The apparatus of claim 1 wherein the at least one recipient-specific requirement comprises an identity-based requirement, such that the control circuit will only unlock the selectively-lockable access portal for a recipient if the recipient has an identity that matches the identity-based requirement.

6. The apparatus of claim 5 wherein the identity-based requirement includes a plurality of authorized identities.

7. The apparatus of claim 1 wherein the control circuit is further configured to:

assess credentials presented by an authorized delivery person to automatically unlock the selectively-lockable access portal to thereby permit the authorized delivery person to place another delivered item into the delivered-package vault notwithstanding that the at least one package is still in the delivered-package vault.

8. The apparatus of claim 1 wherein the control circuit is configured to communicate with the remote source, via the two-way communications interface, regarding the at least one recipient-specific requirement for the at least one package that is presently in the delivered-package vault by transmitting to the remote source information provided by a potential recipient and wherein the control circuit is configured to unlock the selectively-lockable access portal upon receiving unlock instructions from the remote source when the potential recipient meets the at least one recipient-specific requirement.

9. A method comprising:

by a control circuit that comprises a part of a delivered-package vault having a selectively-lockable access portal:

reading a radio-frequency identification (RFID) tag for at least one package that is presently in the delivered-package vault;

using information gleaned from reading the RFID tag to automatically detect a need to download recipient-specific requirements from a remote source for the at least one package that is presently in the delivered-package vault;

communicating with the remote source, via a two-way communications interface, regarding at least one recipient-specific requirement for the at least one package that is presently in the delivered-package vault; and unlocking the selectively-lockable access portal to thereby provide access to the at least one package by a recipient who meets the at least one recipient-specific requirement.

10. The method of claim 9 wherein the two-way communications interface comprises a wireless two-way communications interface.

11. The method of claim 9 wherein the at least one recipient-specific requirement comprises a recipient age-based requirement.

12. The method of claim 11 wherein the recipient age-based requirement is a requirement that the recipient be at least 21 years of age, such that the control circuit will only unlock the selectively-lockable access portal for a recipient if the recipient is at least 21 years of age.

13. The method of claim 9 wherein the at least one recipient-specific requirement comprises an identity-based requirement, such that the control circuit will only unlock the selectively-lockable access portal for a recipient if the recipient has an identity that matches the identity-based requirement.

14. The method of claim 13 wherein the identity-based requirement includes a plurality of authorized identities.

15. The method of claim 9 further comprising:

assessing credentials presented by an authorized delivery person to automatically unlock the selectively-lockable access portal to thereby permit the authorized delivery person to place another delivered item into the delivered-package vault notwithstanding that the at least one package is still in the delivered-package vault.

16. The method of claim 9 wherein:

communicating with a remote source, via a two-way communications interface, regarding at least one recipient-specific requirement for at least one package that is presently in the delivered-package vault comprises transmitting to the remote source information provided by a potential recipient; and unlocking the selectively-lockable access portal to thereby provide access to the at least one package by a recipient who meets the at least one recipient-specific requirement comprises unlocking the selectively-lockable access portal upon receiving unlock instructions from the remote source when the potential recipient meets the at least one recipient-specific requirement.

* * * * *